United States Patent [19]

Nalepka

[11] 3,715,197

[45] Feb. 6, 1973

[54] METHOD AND PREFORM FOR RESHAPING GLASS TUBING

[75] Inventor: Raymond Nalepka, Farmington, Mich.

[73] Assignee: The Bendix Corporation

[22] Filed: Dec. 10, 1970

[21] Appl. No.: 96,811

[52] U.S. Cl............................................65/54, 65/42
[51] Int. Cl. ........................C03b 23/08, C03b 23/20
[58] Field of Search........65/54, 299, 40, 41, 36, 277, 65/42

[56] References Cited

UNITED STATES PATENTS 1,547,715  7/1925  Baker...................................65/36 X

FOREIGN PATENTS OR APPLICATIONS 789,612  1958  Great Britain............................65/54

58,901  1947  Netherlands..............................65/36

Primary Examiner—Arthur D. Kellogg
Attorney—John R. Benefiel and Plante, Hartz, Smith and Thompson

[57] ABSTRACT

A method and preform for flaring or otherwise reshaping stock glass tubing is disclosed, in which an additional section of glass tubing is placed over the existing section of the glass tubing to be flared or reshaped and fused thereto at one end to create the preform, with conventional flaring or reshaping techniques then being applied to this preform to yield a flared or otherwise reshaped section of a relatively heavy-walled construction.

4 Claims, 2 Drawing Figures

FIG. 2
STEP 5
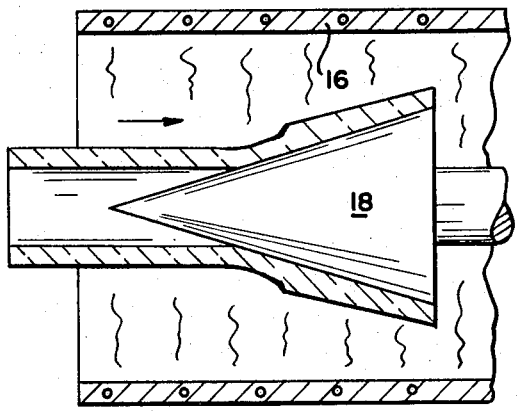
STEP 6
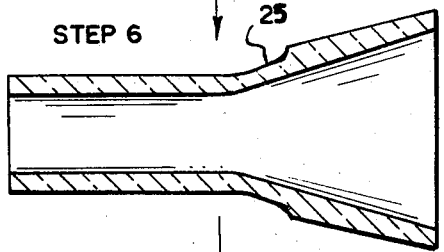
STEP 7
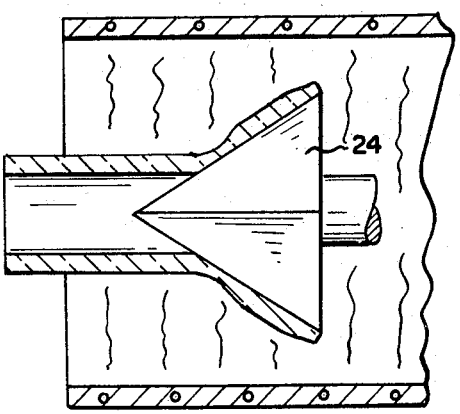
STEP 8
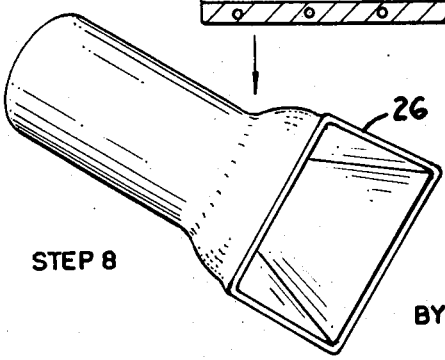
INVENTOR
RAYMOND NALEPKA
BY John R. Benefiel
ATTORNEY

METHOD AND PREFORM FOR RESHAPING GLASS TUBING

BACKGROUND OF THE INVENTION

1. Field of the Invention

This invention concerns glass working and more specifically reshaping of tubular glass stock.

2. Description of the Prior Art

In flaring or otherwise reshaping glass tubing by conventional techniques, reductions in wall thickness occur due to stretching of the material. In some applications of the prior art flaring techniques, such as forming input apertures of channel electron multipliers, the extent of such flaring is limited since the finished product may be subjected to high shock loadings and the reduced wall thickness is thus much more vulnerable to breakage. In addition, in attempting to reshape the flared portion into angular shapes, such as into a rectangular cross section, by means of a reshaping mandrel, either the flared wall thickness was insufficient to prevent excessive thinning at the outer edge or the thickness at the inner portions would be too great to be reshaped by the relatively fragile carbon mandrels normally used.

Therefore, an object of the present invention is to provide a technique for flaring or otherwise reshaping tubular glass stock without causing excessive reductions in wall thickness.

Another object of the present invention is to provide a technique and preform for reshaping the cross-sectional shape of such a flared portion with neither excessive reductions in wall thickness at the outer edges thereof nor excessive force on the reshaping mandrel required due to relatively heavy wall thicknesses.

SUMMARY OF THE INVENTION

These objects and others which will become apparent upon a reading of the following specification and claims are accomplished by a technique in which an additional section of glass tubing is placed over the section to be reshaped and fused thereto at one end to create a preform, with conventional flaring methods being applied to the preform to yield a flared section of relatively heavy walled construction. In reshaping this flared section, the length of the additional section of glass tubing is selected to occupy only a portion of the flared length so that the inner section remains relatively thin walled to facilitate the reshaping operation.

BRIEF DESCRIPTION OF THE DRAWING

FIG. 2 is a sectional representation of a section of glass tubing undergoing a modified form of the process according to the present invention, and in addition a subsequent reshaping process.

DETAILED DESCRIPTION OF THE PREFERRED EMBODIMENT

Figure 1:
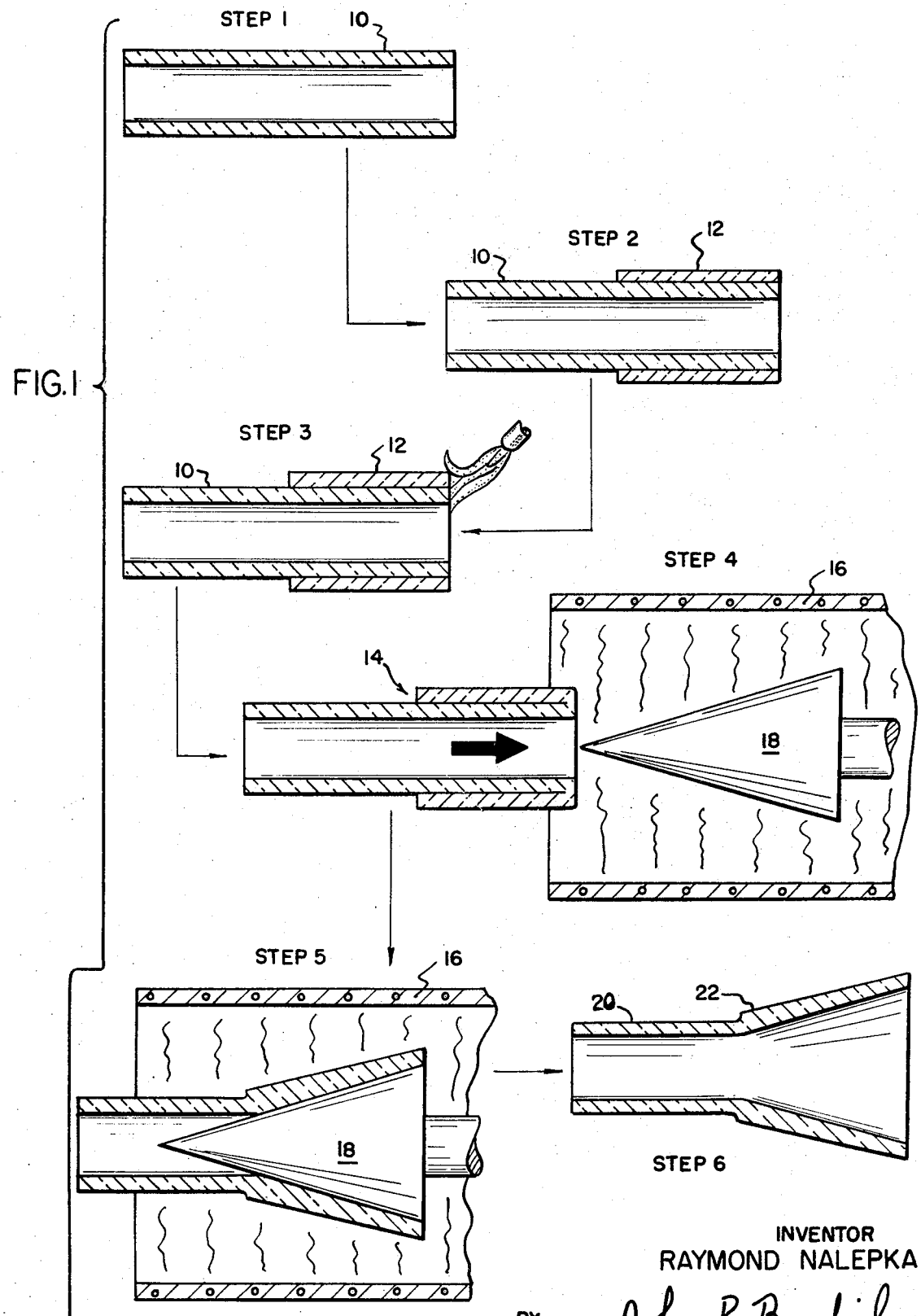
FIG. 1 is a sectional representation of a section of glass tubing undergoing the steps of the process comprising the present invention.

In the following detailed description, certain specific terminology will be utilized for the sake of clarity and a specific embodiment described in order to provide a complete understanding of the invention, but the invention is not so limited and may be practiced in a variety of forms and embodiments.

Referring to FIG. 1, a blank 10 comprised of a glass tube is shown in section, cut to length and of the desired composition and wall thickness.

In step 2, the blank 10 is inserted into a second length of glass tubing 12 of the same composition and just slidable thereover, until the inserted end of blank 10 is flush with the opposite end of tubing 12, while in step 3, the flush ends of the tubes 10 and 12 are fused together as by the direct application of heat as illustrated, sealing together these ends of the tubes to yield the preform 14 according to the present invention.

In step 4, the preform 14 is placed into a heating chamber 16 containing a conical flaring mandrel 18, and reshaped thereon as depicted in step 5.

The temperature within the heating chamber 16 is selected so as to be capable of softening the particular glass composition of the preform 14 sufficiently to allow the preform to be reshaped to that of the conical flaring mandrel 18, and to cause subsequent fusing together of the tubes 10 and 12 to yield an integral finished item 20 after withdrawal from the heating chamber 16 and cooling as depicted in step 6.

It has been found that the progressive flaring of the preform 14 as it is expanded by the conical flaring mandrel 18 drives out any trapped air that may have been between the tubes 10 and 12 and is prevented from reentering via the fused ends of the preform 14, so the finished item 20 is free from voids resulting from any such trapped air. The fusing of the ends also prevents any relative movement of the tube sections 10 and 12 during the initial flaring operation.

Thus, the finished item 20 is relatively heavy walled in the vicinity of the flared section 22 due to the inclusion of the extra section of tubing 12, which allows more extreme flaring operations without resulting in an item of undue fragility.

Furthermore, this has been accomplished by the use of a preform which may be comprised of standard glass tubing and by conventional flaring techniques, thus providing an economical method of manufacture.

It should also be appreciated that this technique, while particularly useful in flaring circular cross sections of glass tubing, would also be useful in reshaping other cross-sectional tube shapes or in other reshaping operations, such as forming rectangular shapes from circular tubes, or wherever the reshaping operation tends to unduly stretch the walls of the preform.

In this context, some modification of the process as described infra is advantageous, as described in FIG. 2. Inasmuch as the process is identical in preparing the preform, except for sizing, the steps earlier to step 5 are omitted.

As can be seen in steps 5 and 6, the flaring operation flares beyond the length of the added section 12 so that the flared section 22 has a reduced thickness portion 25.

Thus, in the subsequent reshaping step 7 the angularly shaped carbon mandrel 24 may easily reshape the flared item 20 to yield the finished item 26 since it does not encounter a relatively heavy walled inner section.

This is accomplished without excessive thinning of the outer section wall thickness in the same manner as in the above-described process.

In this same context, it should also be appreciated that the length of added section 12 could be adjusted for optimal material utilization inasmuch as wall thickening may not be required throughout the flared section since the wall does not stretch nearly as much in the inner region as at the extreme outer edge of the flared section.

While specific examples of the present invention have been described, many modifications and substitutions are, of course, possible within the scope of the appended claims.

What is claimed is:

1. A method of reshaping an end section of a glass tube, wherein glass is added to the reshaped end section to produce a heavy-walled construction comprising the steps of:

inserting an end section of a first glass tube to be reshaped into one end of a second glass tube until the inserted end of said first glass tube is flush with the opposite end of said second glass tube;

fusing together said flush ends of said glass tubes forming a preform;

subsequently heating said preform in the region of said end section to its softening point; and reshaping said end section by progressively expanding from said fused end inwardly said softened end section, said progressive expanding further progressively fusing together the previous unfused portions of said preform.

2. The method of claim 1 wherein said reshaping step includes the step of flaring said end.

3. The method of claim 2 wherein the length of said second glass tube added in said placing step is less than the length of said end flared in said flaring step.

4. The method of claim 3 wherein said method further includes the step of angularly reshaping said flared section by heating said flared section to its softening point and drawing said flared section over an angularly shaped mandrel.

* * * * *